US010457380B2

(12) United States Patent
Choi et al.

(10) Patent No.: US 10,457,380 B2
(45) Date of Patent: Oct. 29, 2019

(54) ARTICULATED ROTOR SYSTEMS WITH PITCH INDEPENDENT DAMPING

(71) Applicant: Bell Helicopter Textron Inc., Fort Worth, TX (US)

(72) Inventors: Jouyoung Jason Choi, Fort Worth, TX (US); Thomas Clement Parham, Jr., Fort Worth, TX (US); Gary Miller, Fort Worth, TX (US); Frank Bradley Stamps, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 608 days.

(21) Appl. No.: 15/636,448

(22) Filed: Jun. 28, 2017

(65) Prior Publication Data

US 2019/0002085 A1    Jan. 3, 2019

(51) Int. Cl.
| | |
|---|---|
| *B64C 11/06* | (2006.01) |
| *B64C 27/35* | (2006.01) |
| *B64C 27/51* | (2006.01) |
| *B64C 27/635* | (2006.01) |
| *B64C 29/00* | (2006.01) |
| *B64C 11/32* | (2006.01) |
| *F16F 15/121* | (2006.01) |

(Continued)

(52) U.S. Cl.
CPC .............. *B64C 11/06* (2013.01); *B64C 11/32* (2013.01); *B64C 27/35* (2013.01); *B64C 27/51* (2013.01); *B64C 27/635* (2013.01); *B64C 29/0033* (2013.01); *F16F 15/121* (2013.01); *F16C 23/043* (2013.01); *F16C 27/02* (2013.01); *F16C 2326/43* (2013.01); *F16F 15/124* (2013.01); *F16F 15/1208* (2013.01)

(58) Field of Classification Search
CPC ........ B64C 27/35; B64C 27/51; B64C 27/635
See application file for complete search history.

(56) References Cited

U.S. PATENT DOCUMENTS

| | | | | |
|---|---|---|---|---|
| 4,341,499 A | * | 7/1982 | Peterson ................. | B64C 27/35 416/134 A |
| 4,915,585 A | * | 4/1990 | Guimbal ................. | B64C 27/51 416/107 |

(Continued)

OTHER PUBLICATIONS

European Search Report; Application No. 18167032.4; European Patent Office; dated Jul. 3, 2018.

(Continued)

*Primary Examiner* — Justin M Benedik
(74) *Attorney, Agent, or Firm* — Lawrence Youst PLLC (57) ABSTRACT

A proprotor system operable for use on a tiltrotor aircraft having a helicopter flight mode and an airplane flight mode. The proprotor system includes a rotor hub and a plurality of proprotor blades coupled to the rotor hub such that each proprotor blade has three independent degrees of freedom relative to the rotor hub including blade pitch about a pitch change axis, blade flap about a flapping axis and lead-lag about a lead-lag axis. Each of a plurality of spherical bearings couples one of the proprotor blades with the rotor hub. In addition, each of a plurality of lead-lag dampers couples one of the proprotor blades with the rotor hub, wherein each lead-lag damper is aligned with the pitch change axis of the respective proprotor blade, thereby providing pitch independent lead-lag damping.

20 Claims, 5 Drawing Sheets

(51) Int. Cl.
    *F16C 23/04*       (2006.01)
    *F16C 27/02*       (2006.01)
    *F16F 15/12*       (2006.01)
    *F16F 15/124*      (2006.01)

(56) References Cited

U.S. PATENT DOCUMENTS

| | | | | |
|---|---|---|---|---|
| 5,228,834 | A * | 7/1993 | Yamamoto | B64C 27/33 |
| | | | | 416/131 |
| 5,372,478 | A * | 12/1994 | McCafferty | B64C 27/51 |
| | | | | 416/106 |
| 5,620,305 | A * | 4/1997 | McArdle | B64C 27/45 |
| | | | | 416/134 A |
| 6,641,365 | B2 * | 11/2003 | Karem | B64C 27/33 |
| | | | | 416/1 |
| 7,828,525 | B2 * | 11/2010 | Stamps | B64C 27/35 |
| | | | | 188/266.3 |
| 7,845,909 | B2 * | 12/2010 | Stamps | B64C 27/48 |
| | | | | 416/134 A |
| 8,181,755 | B2 | 5/2012 | Stamps et al. | |
| 8,424,799 | B2 * | 4/2013 | Popelka | B64C 27/001 |
| | | | | 244/17.27 |
| 8,955,792 | B2 * | 2/2015 | Schank | B64C 27/008 |
| | | | | 244/17.13 |
| 9,126,680 | B2 * | 9/2015 | Stamps | B64C 27/51 |
| 9,284,051 | B2 * | 3/2016 | Amari | B64C 27/51 |
| 2009/0110555 | A1 * | 4/2009 | Jones | B64C 27/51 |
| | | | | 416/140 |
| 2010/0247312 | A1 * | 9/2010 | Girard | B64C 27/35 |
| | | | | 416/134 A |
| 2013/0004311 | A1 * | 1/2013 | Stamps | B64C 27/35 |
| | | | | 416/1 |
| 2013/0105637 | A1 * | 5/2013 | Stamps | B64C 29/0033 |
| | | | | 244/76 R |
| 2014/0248150 | A1 * | 9/2014 | Sutton | B64C 27/32 |
| | | | | 416/1 |
| 2015/0122953 | A1 * | 5/2015 | Burnett | B64C 27/33 |
| | | | | 244/7 A |
| 2015/0251753 | A1 * | 9/2015 | Jarrett | B64C 27/35 |
| | | | | 416/104 |
| 2015/0336664 | A1 * | 11/2015 | Rauber | B64C 27/54 |
| | | | | 416/1 |
| 2016/0059959 | A1 * | 3/2016 | Stucki | B64C 27/48 |
| | | | | 416/131 |
| 2017/0129598 | A1 * | 5/2017 | Stucki | B64C 27/48 |
| 2017/0334555 | A1 * | 11/2017 | Amari | B64C 27/48 |

OTHER PUBLICATIONS

European Exam Report; Application No. 18167032.4; European Patent Office; dated Nov. 22, 2018.
European Exam Report; Application No. 18167032.4; European Patent Office; dated Jul. 25, 2018.

* cited by examiner

ARTICULATED ROTOR SYSTEMS WITH PITCH INDEPENDENT DAMPING

TECHNICAL FIELD OF THE DISCLOSURE

The present disclosure relates, in general, to rotor systems operable for use on rotorcraft and, in particular, to articulated rotor systems operable for use on tiltrotor aircraft including a plurality of proprotor blades each coupled to a rotor hub via a coincident hinge and a lead-lag damper that provides pitch independent damping.

BACKGROUND

Tiltrotor aircraft typically include multiple propulsion assemblies that are positioned near outboard ends of a fixed wing. Each propulsion assembly may include an engine and transmission that provide torque and rotational energy to a drive shaft that rotates a proprotor system including a rotor hub and a plurality of proprotor blades. Typically, at least a portion of each propulsion assembly is rotatable relative to the fixed wing such that the proprotor blades have a generally horizontal plane of rotation providing vertical lift for takeoff, hovering and landing, much like a conventional helicopter, and a generally vertical plane of rotation providing forward thrust for cruising in forward flight with the fixed wing providing lift, much like a conventional propeller driven airplane. In addition, tiltrotor aircraft can be operated in configurations between the helicopter flight mode and the airplane flight mode, which may be referred to as conversion flight mode.

Certain rotor systems include an articulated connection between the rotor blades and the rotor hub such that the rotor blades have three independent degrees of freedom; namely, blade pitch, blade flap and lead-lag motion. These rotor systems typically include a lead-lag damper for each rotor blade. In addition, these rotor systems may include a separate hinge for each degree of freedom of each rotor blade requiring, for example, twelve hinges in a rotor system having four rotor blades. One option for reducing the complexity of such rotor systems is to use spherical elastomeric bearings for coupling the rotor blades to the rotor hub providing a coincident hinge for all three degrees of freedom. It has been found, however, that the damping force of lead-lag dampers in such coincident hinge articulated rotor systems is affected by the pitch of the rotor blades. Such pitch dependent damping is problematic for tiltrotor aircraft as the proprotor systems must operate in both helicopter and airplane flight modes.

SUMMARY

In a first aspect, the present disclosure is directed to a proprotor system for tiltrotor aircraft having a helicopter mode and an airplane mode. The proprotor system includes a rotor hub and a plurality of proprotor blades coupled to the rotor hub such that each proprotor blade has three independent degrees of freedom relative to the rotor hub including blade pitch about a pitch change axis, blade flap about a flapping axis and lead-lag about a lead-lag axis. Each of a plurality of spherical bearings couples one of the proprotor blades with the rotor hub. In addition, each of a plurality of lead-lag dampers couples one of the proprotor blades with the rotor hub, wherein each lead-lag damper is aligned with the pitch change axis of the respective proprotor blade, thereby providing pitch independent lead-lag damping.

In some embodiments, each lead-lag damper may include an in-plane spring rate that is independent of blade pitch. In certain embodiments, each lead-lag damper may be disposed outboard of the respective spherical bearing. In other embodiments, each lead-lag damper may be disposed inboard of the respective spherical bearing. In some embodiments, each lead-lag damper may include a damping cylinder coaxially aligned with the pitch change axis of the respective proprotor blade, a damping support coupled to the rotor hub and a damping link coupling the damping cylinder to the damping support. In such embodiments, the damping link may be coupled to the damping support inline with the flapping axis of the respective proprotor blade. Also, in such embodiments, each damping cylinder may include a mechanical spring, a fluid spring or a combination thereof having an in-plane spring rate operable to provide lead-lag damping to the respective proprotor blade and/or at least a portion of each damping cylinder may be operable to rotate about the pitch change axis of the respective proprotor blade responsive to a change in pitch of the respective proprotor blade.

In certain embodiments, each lead-lag damper may include an elastomeric damping element coupled to the rotor hub and a damping link coupling the respective proprotor blade to the elastomeric damping element. In such embodiments, the damping link may have a first rotary bearing coaxially aligned with the pitch change axis of the respective proprotor blade and a second rotary bearing coupled to the elastomeric damping element. In some embodiments, a plurality of blade anchors may each couple one of the spherical bearings with the rotor hub. In certain embodiments, a plurality of blade grips may each couple one of the spherical bearings with the respective proprotor blade. In such embodiments, each blade grip may include a pitch horn operable to receive collective input and/or cyclic input from a pitch control assembly.

In a second aspect, the present disclosure is directed to a tiltrotor aircraft having a helicopter flight mode and an airplane flight mode. The tiltrotor aircraft includes a fuselage, a wing extending from the fuselage having first and second outboard ends and first and second pylon assemblies respectively coupled to the wing proximate the first and second outboard ends. A proprotor system is operably associated with each pylon assembly. Each proprotor system includes a rotor hub and a plurality of proprotor blades coupled to the rotor hub such that each proprotor blade has three independent degrees of freedom relative to the rotor hub including blade pitch about a pitch change axis, blade flap about a flapping axis and lead-lag about a lead-lag axis. Each of a plurality of spherical bearings couples one of the proprotor blades with the rotor hub. In addition, each of a plurality of lead-lag dampers couples one of the proprotor blades with the rotor hub, wherein each lead-lag damper is aligned with the pitch change axis of the respective proprotor blade, thereby providing pitch independent lead-lag damping.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
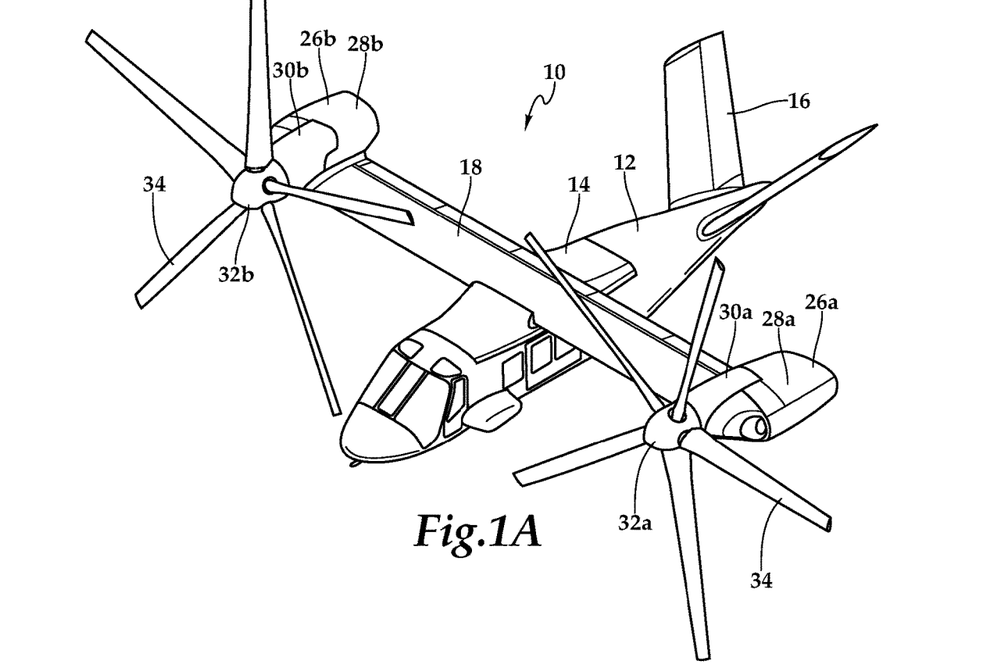
FIGS. 1A-1B are schematic illustrations of a tiltrotor aircraft in an airplane flight mode and a helicopter flight mode, respectively, in accordance with embodiments of the present disclosure.
Figure 1B:
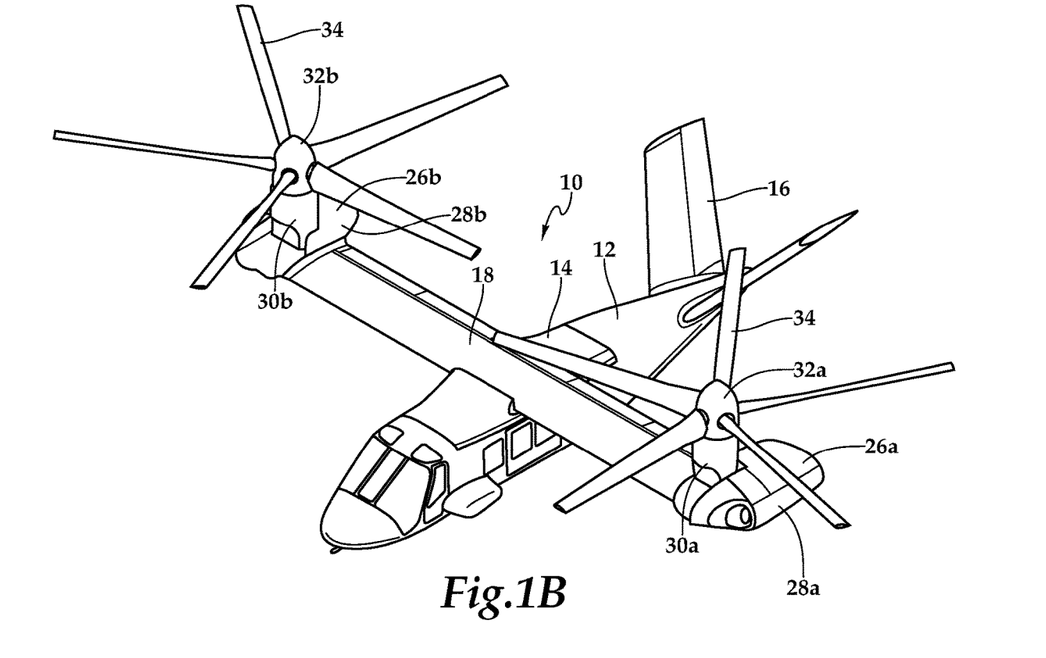

Referring to FIGS. 1A-1B in the drawings, a tiltrotor aircraft is schematically illustrated and generally designated 10. Tiltrotor aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, supports, longerons, stringers, bulkheads, spars, ribs, skins and the like form the airframe of tiltrotor aircraft 10.

Coupled to the outboard ends of wing 18 are propulsion assemblies 26a, 26b. Propulsion assemblies 26a, 26b include fixed nacelles 28a, 28b, respectively, each of which preferably houses a fixed portion of a drive system such as an engine and transmission. A pylon assembly 30a is rotatable relative to fixed nacelle 28a and wing 18 between a generally horizontal orientation, as best seen in FIG. 1A, and a generally vertical orientation, as best seen in FIG. 1B. Pylon assembly 30a preferably includes a portion of the drive system and a proprotor system 32a that is rotatable responsive to torque and rotational energy provided via the drive system. Likewise, a pylon assembly 30b is rotatable relative to fixed nacelle 28b and wing 18 between a generally horizontal orientation, as best seen in FIG. 1A, and a generally vertical orientation, as best seen in FIG. 1B. Pylon assembly 30b preferably includes a portion of the drive system and a proprotor system 32b that is rotatable responsive to torque and rotational energy provided via the drive system. In the illustrated embodiment, proprotor systems 32a, 32b each include five proprotor blade assemblies 34.

It should be understood by those having ordinary skill in the art that even though the illustrated embodiment depicts the proprotor systems having five proprotor blades, a proprotor system of the present disclosure could have alternate numbers of proprotor blades both greater than or less than five including proprotor systems having three proprotor blades, proprotor systems having four proprotor blades or proprotor systems having at least six proprotor blades. The position of pylons 30a, 30b, the angular velocity or revolutions per minute (RPM) of the proprotor systems 32a, 32b, the pitch of proprotor blades 34 and the like are determined using a flight control system, with or without pilot input, to selectively control the direction, thrust and lift of tiltrotor aircraft 10 during flight. As used herein, the term "coupled" may include direct or indirect coupling by any means, including moving and/or non-moving mechanical connections.

FIG. 1A illustrates tiltrotor aircraft 10 in a forward flight mode or airplane flight mode, in which proprotor systems 32a, 32b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 32a, 32b are positioned to rotate in a substantially horizontal plane to provide a vertical lift such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor systems 32a, 32b positioned between airplane flight mode and helicopter flight mode, which can be referred to as conversion flight mode.

Preferably, each fixed nacelle 28a, 28b houses a drive system, such as an engine and transmission, for supplying torque and rotational energy to a respective proprotor system 32a, 32b. In such embodiments, the drive systems of each fixed nacelle 28a, 28b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor system 32a, 32b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems.

It should be understood by those having ordinary skill in the art that teachings of certain embodiments relating to the proprotor systems of the present disclosure described herein may apply to aircraft other than tiltrotor aircraft, such as non-tilting rotorcraft including helicopter rotor systems and fixed wing aircraft including propeller systems. In addition, it should be understood by those having ordinary skill in the art that teachings of certain embodiments relating to the proprotor systems of the present disclosure described herein may apply to both manned and unmanned aircraft.

In general, proprotor systems for tiltrotor aircraft should be designed to achieve blade flap or out-of-plane frequencies and lead-lag or in-plane frequencies that are sufficiently distant from the excitation frequencies generated by the proprotor systems corresponding to 1/rev (1 per revolution), 2/rev, 3/rev, etc. As an example, if a proprotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a proprotor system will result in a proportional change in the excitation frequencies generated by the proprotor system. For tiltrotor aircraft, flight in airplane mode typically requires less thrust than flight in helicopter mode. One way to reduce thrust as well as increase endurance, reduce noise levels and reduce fuel consumption is to reduce the operating speed of the proprotor systems. For example, in helicopter mode, the tiltrotor aircraft may operate at 100 percent of design RPM, but in airplane mode, the tiltrotor aircraft may operate at a reduced percent of design RPM such as between about 80 percent and about 90 percent of design RPM, between about 70 percent and about 80 percent of design RPM, between about 60 percent and about 70 percent of design RPM, between about 50 percent and about 60 percent of design RPM and/or between about 40 percent and about 50 percent of design RPM. Thus, to achieve desirable rotor dynamics, the proprotor systems for tiltrotor aircraft should be designed to avoid the frequencies of 1/rev, 2/rev, 3/rev, etc. for both helicopter mode and airplane mode operations.

In the illustrated embodiment, each proprotor system 32a, 32b includes five proprotor blades 34 that are positioned circumferentially about a rotor hub at approximately seventy-two degree intervals. Preferably, proprotor blades 34 are formed from a high-strength and lightweight material. For example, the structural components of proprotor blades 34 may be formed from carbon-based materials such as graphite-based materials, graphene-based materials or other carbon allotropes including carbon nanostructure-based materials such as materials including single-walled and multi-walled carbon nanotubes. In one example, the spar and/or skin of proprotor blades 34 are preferably monolithic structures formed using a broad goods and/or layered tape construction process having a manual or automated layup of a plurality of material layers including carbon fabrics, carbon tapes and combinations thereof, positioned over one or more mandrels having simple geometric surfaces with smooth transitions. After curing and other processing steps, the material layers form high-strength, lightweight solid composite members. In this process, the material thicknesses of the components can be tailoring spanwise and chordwise to achieve the desired properties.

Proprotor blades 34 are preferably designed to a desired stiffness and/or stiffness to mass ratio such that when operated within the proprotor systems of the present disclosure, the first-in-plane frequency of proprotor blades 34 is below 1.0/rev. For example, the first-in-plane frequency for both helicopter mode and airplane mode operations of proprotor blades 34 may be in a range between about 0.2/rev and about 0.9/rev. In such embodiments, the first-in-plane frequency of proprotor blades 34 may preferably be in a range between about 0.3/rev and about 0.85/rev. Maintaining a suitable first-in-plane frequency decouples the first-in-plane lead-lag frequency from the per revolution excitations frequencies and the out-of-plane flapping frequency.

Figure 2A:
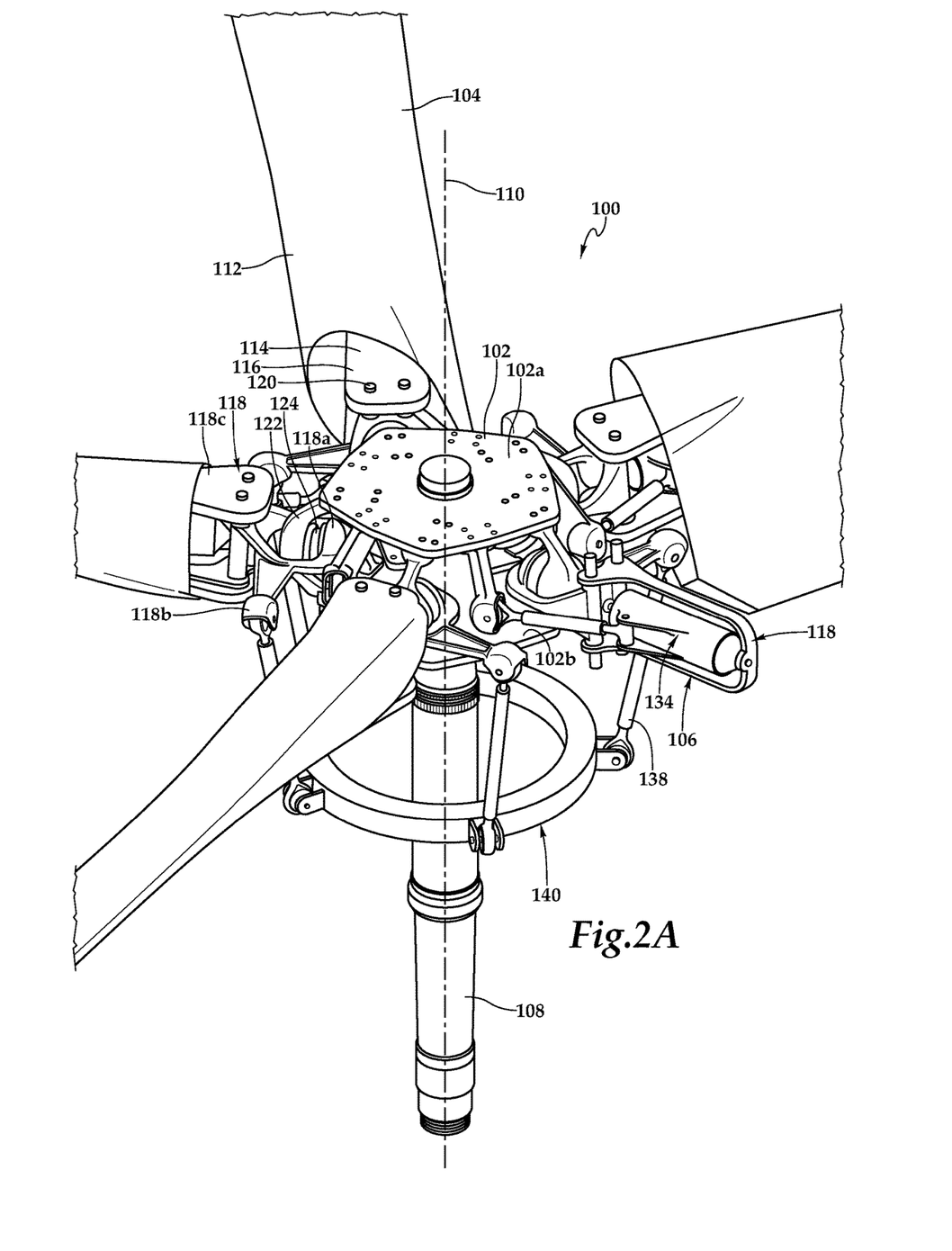
FIG. 2A is an isometric view of a proprotor system for use on a tiltrotor aircraft in accordance with embodiments of the present disclosure.
Figure 2B:
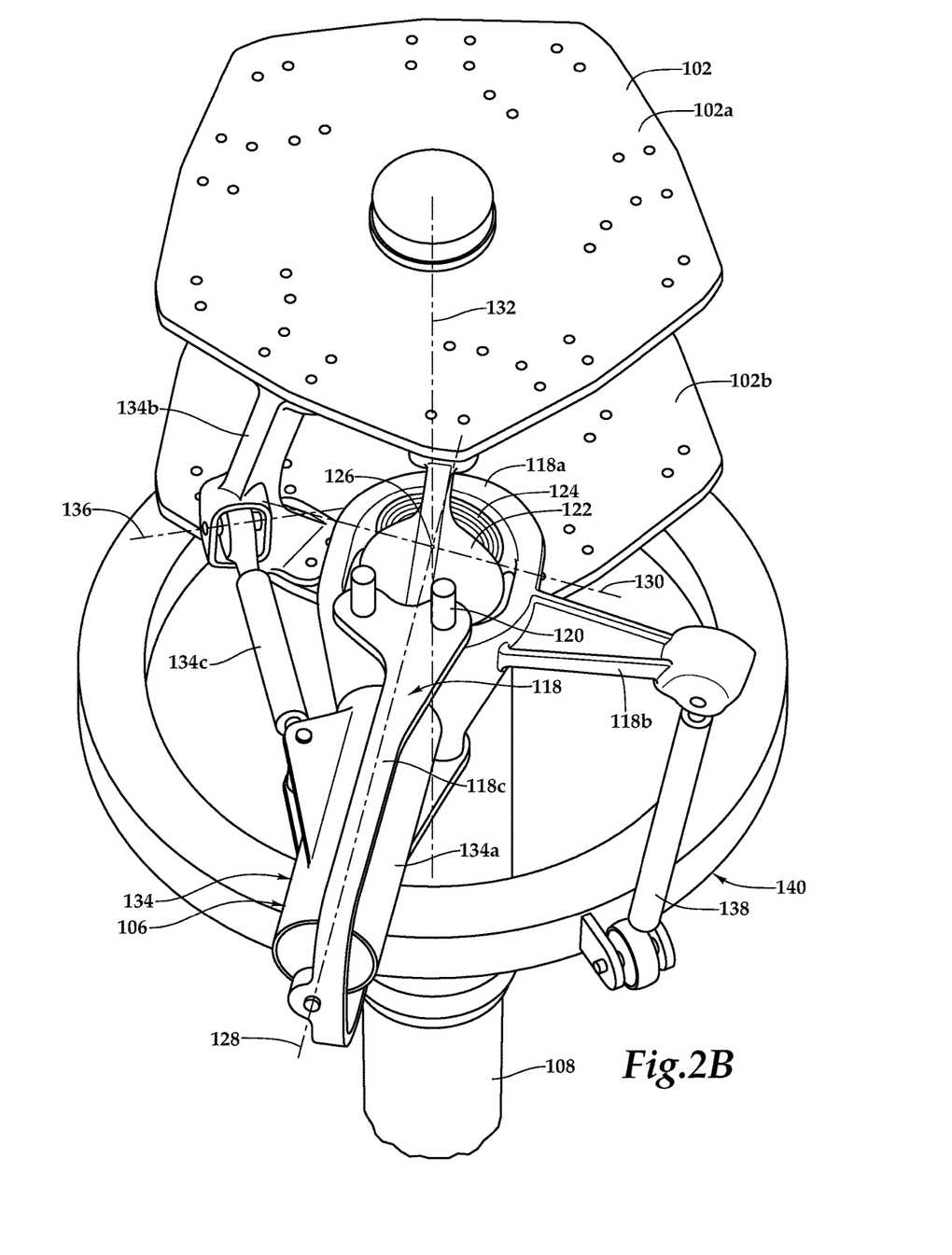
FIG. 2B is an isometric view of a lead-lag damper of a proprotor system for use on a tiltrotor aircraft in accordance with embodiments of the present disclosure.

Referring next to FIGS. 2A-2B in the drawings, a proprotor system for tiltrotor aircraft is depicted and generally designated 100. In the illustrated embodiment, proprotor system 100 includes a rotor hub 102 having five proprotor blades 104 coupled thereto with one of the proprotor blades 104 removed in FIG. 2A to reveal a coupling assembly 106. Rotor hub 102 has an upper rotor plate 102a and a lower rotor plate 102b. A mast 108 is received within an opening extending through the body of rotor hub 102 such that rotor hub 102 rotates therewith. Mast 108 is coupled to a drive system of the tiltrotor aircraft including an engine and transmission that provide torque and rotational energy to proprotor system 100 to enable rotation about a rotational axis 110. In the illustrated embodiment, each proprotor blade 104 includes an outer skin 112 having a spar 114 that extends spanwise toward the tip of proprotor blade 104. Spars 114 are preferably the main structural member of proprotor blades 104 designed to carry the primary centrifugal and bending loads of proprotor blades 104. Proprotor blades 104 may have a root-to-tip twist on the order of about 20 degrees to about 40 degrees or other suitable root-to-tip twist. Each spar 114 has a root section depicted as integral cuff 116 to enable coupling of each proprotor blade 104 with a respective blade grip 118 of a coupling assembly 106 using suitable connecting members depicted as pins 120. In the illustrated embodiment, each blade grip 118 includes a bearing support 118a, a pitch horn 118b and a grip loop 118c, as best seen in FIG. 2B.

Each coupling assembly 106 includes a blade anchor 122 that is coupled to upper rotor plate 102a and lower rotor plate 102b by bolting or other suitable technique. Each coupling assembly 106 also includes a centrifugal force bearing 124. As illustrated, each centrifugal force bearing 124 is a twin spherical elastomeric bearing having a pair of oppositely disposed spherical surfaces. The inboard spherical surface of each centrifugal force bearing 124 corresponds to a spherical surface of a bearing support 118a and the outboard spherical surface of each centrifugal force bearing 124 corresponds to a spherical surface of blade anchor 122. The connections between centrifugal force bearings 124 and bearing supports 118a and between centrifugal force bearings 124 and blade anchors 122 are permanent and may be made by vulcanizing the elastomeric material of centrifugal force bearings 124 directly on these surfaces or by bonded, adhered or otherwise secured the elastomeric material in a non-removable manner to these surfaces. As such, the spherical surfaces of bearing supports 118a and blade anchors 122 along with centrifugal force bearings 124 may be considered a single mechanical element. Centrifugal force bearings 124 may include a plurality of rigid shims disposed between layers of the elastomeric material. The durometer and thickness of the materials as well as the stiffness, softness and/or spring rate of centrifugal force bearings 124 may be tailored to achieve the desired operational modes based upon the loads and motions expected in the particular application. In operation, each centrifugal force bearing 124 is operable to provide a centrifugal force retention load path from a proprotor blade 104 to rotor hub 102 via a blade grip 118 and a blade anchor 122.

Each centrifugal force bearing 124 provides a coincident hinge with a center point 126 for the pitch change degree of freedom, the flapping degree of freedom and the lead-lag degree of freedom of the respective rotor blade 104 relative to rotor hub 102. As best seen in FIG. 2B, pitch change axis 128, flapping axis 130 and lead-lag axis 132 all pass through coincident hinge point 126. As such, centrifugal force bearings 124 allow each rotor blade 104 to move independent of the other rotor blades 104 and independent of rotor hub 102 with a pitch change degree of freedom, a flapping degree of freedom and a lead-lag degree of freedom about coincident hinge point 126.

Each coupling assembly 106 includes a lead-lag damper 134. Each lead-lag damper 134 has an in-plane spring rate operable to apply a damping force to the lead-lag degree of freedom of a proprotor blade 104 to reduce the in-plane oscillation of the proprotor blade 104. The stiffness, softness and/or in-plane spring rate of lead-lag dampers 134 may be tailored to achieve the desired operational modes based upon the loads and motions expected in the particular application. In the illustrated embodiment, each lead-lag damper 134 includes a damping cylinder 134a, a damping support 134b and a damping link 134c. Each damping cylinder 134a is disposed within a respective grip loop 118c and is coupled between a bearing support 118a and an outboard portion of the grip loop 118c. Each damping cylinder 134a is disposed outboard of the respective centrifugal force bearing 124. Each damping cylinder 134a is coaxially aligned with the pitch change axis 128 of the respective proprotor blade 104. In one example, damping cylinders 134a may be mechanical springs having an in-plane spring rate operable to provide lead-lag damping to the respective proprotor blade 104. In another example, damping cylinders 134a may be fluid springs having an in-plane spring rate operable to provide lead-lag damping to the respective proprotor blade 104. In a further example, damping cylinders 134a may be mechanical springs in combination with fluid springs having an in-plane spring rate operable to provide lead-lag damping to the respective proprotor blade 104.

Each damping support 134b is coupled to upper rotor plate 102a and lower rotor plate 102b by bolting or other suitable technique. Each damping link 134c is respectively coupled between a damping cylinder 134a and a damping support 134b. In the illustrated embodiment, each damping link 134c is securably coupled to a flange of a damping cylinder 134a. On the opposite end, each damping link 134c include a rotary bearing that is received on a rod of a damping support 134b that provides a damping axis 136 about which each damping link 134c may rotate. Each damping axis 136 is inline with or in the same plane as the flapping axis 130 of the respective proprotor blade 104. In this configuration, oscillation of proprotor blades 104 about their respective flapping axes 130 does not affect the in-plane spring rate of lead-lag dampers 134.

In the illustrated embodiment, each blade grip 118 includes a pitch horn 118b that is coupled to a pitch link 138 of a pitch control assembly 140 depicted as the rotating portion of a rise and fall swash plate operable to collectively and/or cyclically control the pitch of proprotor blades 104. As discussed herein, each proprotor blade 104 is operable to independently rotate about its pitch change axis 128 relative to other proprotor blades 104 and rotor hub 102, changing pitch responsive to changes in position of the respective pitch link 138. During pitch change operations, blade grips 118 rotate relative to the respective lead-lag dampers 134. For example, lead-lag dampers 134 may be mounted to blade grips 118 with thrust and rotary bearings to enable this relative rotation. Alternatively, lead-lag dampers 134 may include elastomeric elements that allow the portion of lead-lag dampers 134 that is coupled to a blade grip 118 to rotate relative to the portion of lead-lag dampers 134 that is coupled to a damping support 134b via a damping link 134c. In either case, rotation of blade grips 118 responsive to pitch change operations does not affect the in-plane spring rate of lead-lag dampers 134 as damping cylinders 134a are coaxially aligned with the respective pitch change axes 128.

During flight operations of tiltrotor aircraft 10, the proprotor blades may tend to oscillate forward to a lead position and backwards to a lag position as the proprotor system rotates as a result of conservation of momentum and acceleration/deceleration caused by the Coriolis effect. Lead-lag dampers 134 have an in-plain spring rate operable to apply a damping force to prevent excess back and forth movement of proprotor blade 104. As discussed herein, the lead-lag damping force is unaffected by and/or independent of the flapping degree of freedom of proprotor blade 104. In addition, as discussed herein, the lead-lag damping force is unaffected by and/or independent of the pitch change degree of freedom of proprotor blade 104.

Figure 3A:
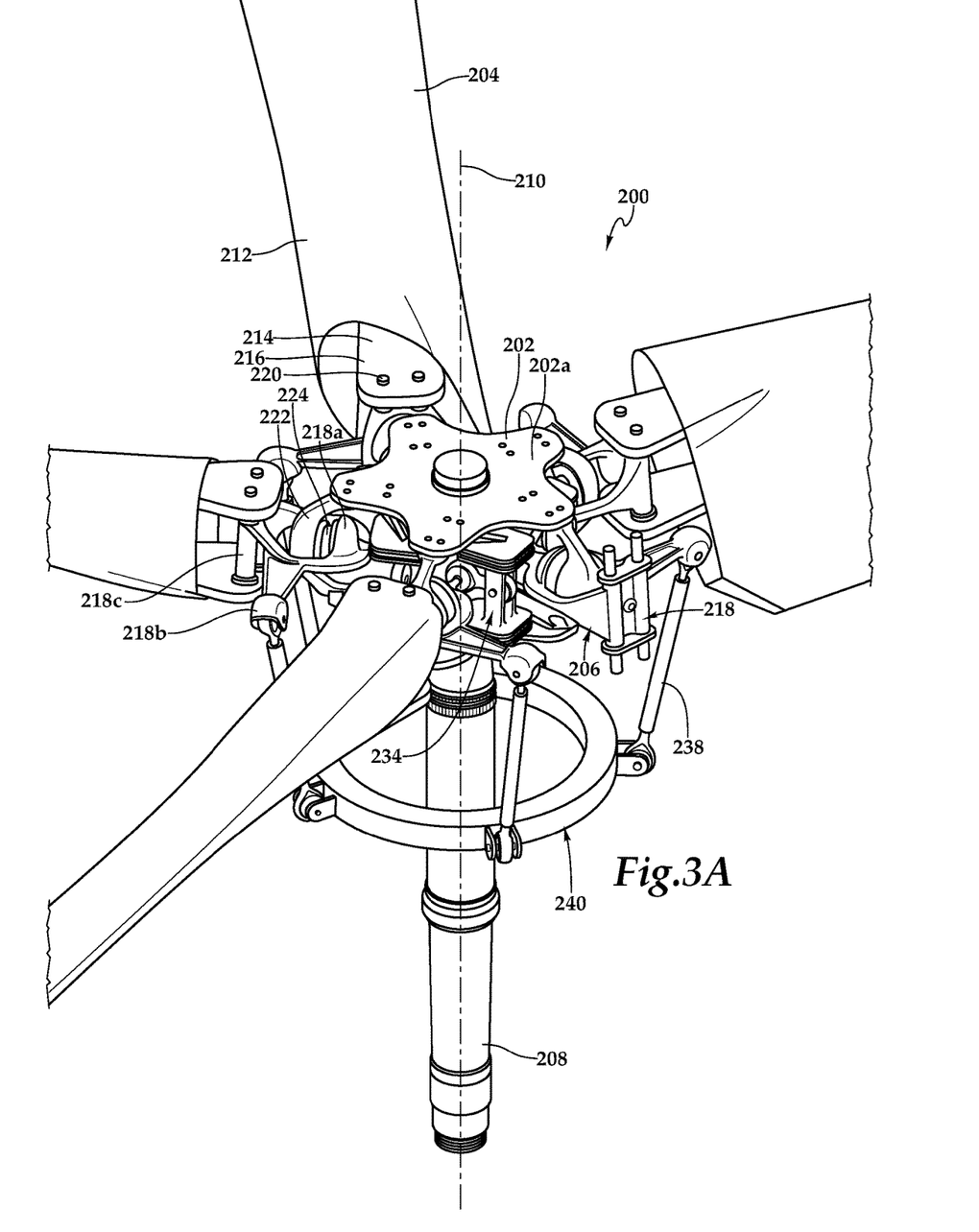
FIG. 3A is an isometric view of a proprotor system for use on a tiltrotor aircraft in accordance with embodiments of the present disclosure.
Figure 3B:
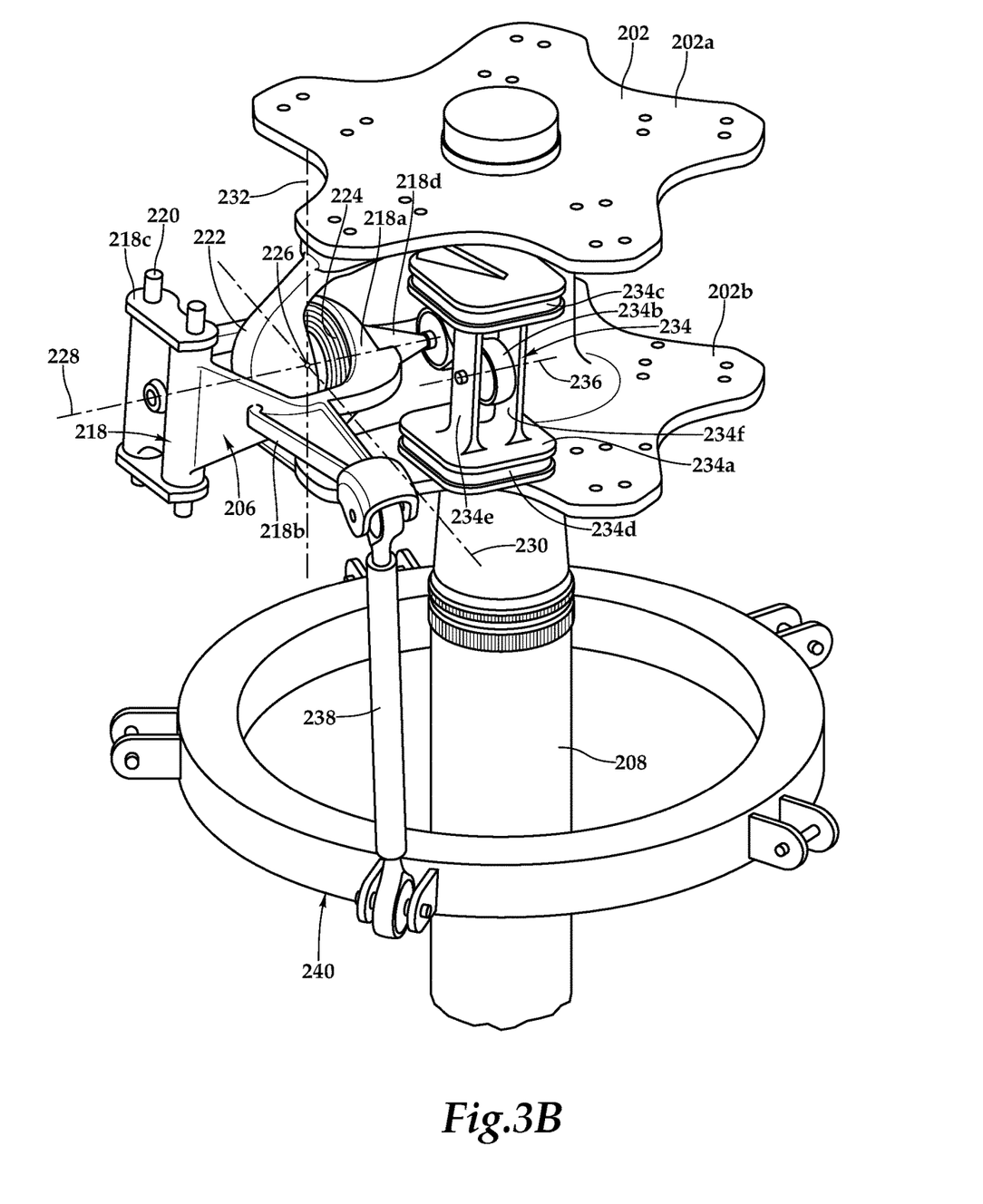
FIG. 3B is an isometric view of a lead-lag damper of a proprotor system for use on a tiltrotor aircraft in accordance with embodiments of the present disclosure.

Referring next to FIGS. 3A-3B in the drawings, a proprotor system for tiltrotor aircraft is depicted and generally designated 200. In the illustrated embodiment, proprotor system 200 includes a rotor hub 202 having five proprotor blades 204 coupled thereto with one of the proprotor blades 204 removed in FIG. 3A to reveal a coupling assembly 206. Rotor hub 202 has an upper rotor plate 202a and a lower rotor plate 202b. A mast 208 is received within an opening extending through the body of rotor hub 202 such that rotor hub 202 rotates therewith. Mast 208 is coupled to a drive system of the tiltrotor aircraft including an engine and transmission that provide torque and rotational energy to proprotor system 200 to enable rotation about a rotational axis 210. In the illustrated embodiment, each proprotor blade 204 includes an outer skin 212 having a spar 214 that extends spanwise toward the tip of proprotor blade 204. Spars 214 are preferably the main structural member of proprotor blades 204 designed to carry the primary centrifugal and bending loads of proprotor blades 204. Proprotor blades 204 may have a root-to-tip twist on the order of about 20 degrees to about 40 degrees or other suitable root-to-tip twist. Each spar 214 has a root section depicted as integral cuff 216 to enable coupling of each proprotor blade 204 with a respective blade grip 218 of a coupling assembly 206 using suitable connecting members depicted as pins 220. In the illustrated embodiment, each blade grip 218 includes a bearing support 218a, a pitch horn 218b, a grip member 218c and a spindle 218d, as best seen in FIG. 2B.

Each coupling assembly 206 includes a blade anchor 222 that is coupled to upper rotor plate 202a and lower rotor plate 202b by bolting or other suitable technique. Each coupling assembly 206 also includes a centrifugal force bearing 224. As illustrated, each centrifugal force bearing 224 is a twin spherical elastomeric bearing having a pair of oppositely disposed spherical surfaces. The inboard spherical surface of each centrifugal force bearing 224 corresponds to a spherical surface of a bearing support 218a and the outboard spherical surface of each centrifugal force bearing 224 corresponds to a spherical surface of blade anchor 222. The connections between centrifugal force bearings 224 and bearing supports 218a and between centrifugal force bearings 224 and blade anchors 222 are permanent and may be made by vulcanizing the elastomeric material of centrifugal force bearings 224 directly on these surfaces or by bonded, adhered or otherwise secured the elastomeric material in a non-removable manner to these surfaces. As such, the spherical surfaces of bearing supports 218a and blade anchors 222 along with centrifugal force bearings 224 may be considered a single mechanical element. Centrifugal force bearings 224 may include a plurality of rigid shims disposed between layers of the elastomeric material. The durometer and thickness of the materials as well as the stiffness, softness and/or spring rate of centrifugal force bearings 224 may be tailored to achieve the desired operational modes based upon the loads and motions expected in the particular application. In operation, each centrifugal force bearing 224 is operable to provide a centrifugal force retention load path from a proprotor blade 204 to rotor hub 202 via a blade grip 218 and a blade anchor 222.

Each centrifugal force bearing 224 provides a coincident hinge with a center point 226 for the pitch change degree of freedom, the flapping degree of freedom and the lead-lag degree of freedom of the respective rotor blade 204 relative to rotor hub 202. As best seen in FIG. 2B, pitch change axis 228, flapping axis 230 and lead-lag axis 232 all pass through coincident hinge point 226. As such, centrifugal force bearings 224 allow each rotor blade 204 to move independent of the other rotor blades 204 and independent of rotor hub 202 with a pitch change degree of freedom, a flapping degree of freedom and a lead-lag degree of freedom about coincident hinge point 226.

Each coupling assembly 206 includes a lead-lag damper 234. Each lead-lag damper 234 has an in-plane spring rate operable to apply a damping force to the lead-lag degree of freedom of a proprotor blade 204 to reduce the in-plane oscillation of the proprotor blade 204. The stiffness, softness and/or in-plane spring rate of lead-lag dampers 234 may be tailored to achieve the desired operational modes based upon the loads and motions expected in the particular application. In the illustrated embodiment, each lead-lag damper 234 includes an elastomeric damping element 234a and a damping link 234b. Each elastomeric damping element 234a is coupled between upper rotor plate 202a and lower rotor plate 202b by bolting or other suitable technique. In the illustrated embodiment, each elastomeric damping element 234a is integral with the respective blade anchor 222 sharing the connections to upper rotor plate 202a and lower rotor plate 202b. Each elastomeric damping element 234a is disposed inboard of the respective centrifugal force bearing 224. Elastomeric damping elements 234a have an in-plane spring rate operable to provide lead-lag damping to the respective proprotor blade 204. The in-plane spring rate may be provided responsive to shearing elastomeric layers 234c, 234d and/or bending of beams 234e, 234f, if beams 234e, 234f are elastomeric.

Each damping link 234b is respectively coupled between an elastomeric damping element 234a and a spindle 218d. In the illustrated embodiment, damping links 234b include a rotary bearing that is received on an inboard end of spindle 218d such that a rotary axis of the rotary bearing is coaxially aligned with the pitch change axis 228 of the respective proprotor blade 204. Damping links 234b also include a rotary bearing that is received on a rod of elastomeric damping element 234a that extends between beams 234e, 234f and provides a damping axis 236 about which damping links 234b may rotate. In this configuration, oscillation of proprotor blades 204 about their respective flapping axes 230 does not affect the in-plane spring rate of lead-lag dampers 234.

In the illustrated embodiment, each blade grip 218 includes a pitch horn 218b that is coupled to a pitch link 238 of a pitch control assembly 240 depicted as the rotating portion of a rise and fall swash plate operable to collectively and/or cyclically control the pitch of proprotor blades 204. As discussed herein, each proprotor blade 204 is operable to independently rotate about its pitch change axis 228 relative to other proprotor blades 204 and rotor hub 202, changing pitch responsive to changes in position of the respective pitch link 238. During pitch change operations, blade grips 218 rotate relative to the respective lead-lag damper 234. For example, spindles 218d may rotate relative to damping links 234b to enable this relative rotation. Alternatively, damping links 234b may include elastomeric elements that allow rotary movement within damping links 234b. In either case, rotation of blade grips 218 responsive to pitch change operations does not affect the in-plane spring rate of lead-lag dampers 234 due to the coaxially alignment with the respective pitch change axes 228.

During flight operations of tiltrotor aircraft 10, the proprotor blades may tend to oscillate forward to a lead position and backwards to a lag position as the proprotor system rotates as a result of conservation of momentum and acceleration/deceleration caused by the Coriolis effect. Lead-lag dampers 234 have an in-plain spring rate operable to apply a damping force to prevent excess back and forth movement of proprotor blade 204. As discussed herein, the lead-lag damping force is unaffected by and/or independent of the flapping degree of freedom of proprotor blade 204. In addition, as discussed herein, the lead-lag damping force is unaffected by and/or independent of the pitch change degree of freedom of proprotor blade 204.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor system operable for use on a tiltrotor aircraft having a helicopter flight mode and an airplane flight mode, the proprotor system comprising:
   a rotor hub;
   a plurality of proprotor blades coupled to the rotor hub such that each proprotor blade has three independent degrees of freedom relative to the rotor hub including blade pitch about a pitch change axis, blade flap about a flapping axis and lead-lag about a lead-lag axis;
   a plurality of twin spherical elastomeric centrifugal force bearings each coupling one of the proprotor blades with the rotor hub and each providing a coincident hinge with a center point for the respective pitch change, flapping and lead-lag axes between a pair of oppositely disposed spherical surfaces; and a plurality of lead-lag dampers each coupling one of the proprotor blades with the rotor hub, each lead-lag damper aligned with the pitch change axis of the respective proprotor blade, thereby providing pitch independent lead-lag damping.

2. The proprotor system as recited in claim 1 wherein each lead-lag damper further comprises an in-plane spring rate that is independent of blade pitch.

3. The proprotor system as recited in claim 1 wherein each lead-lag damper is disposed outboard of the respective spherical bearing.

4. The proprotor system as recited in claim 1 wherein each lead-lag damper is disposed inboard of the respective spherical bearing.

5. The proprotor system as recited in claim 1 wherein each lead-lag damper further comprises a damping cylinder coaxially aligned with the pitch change axis of the respective proprotor blade, a damping support coupled to the rotor hub and a damping link coupling the damping cylinder to the damping support, the damping link coupled to the damping support inline with the flapping axis of the respective proprotor blade.

6. The proprotor system as recited in claim 5 wherein each damping cylinder further comprises a mechanical spring having an in-plane spring rate operable to provide lead-lag damping to the respective proprotor blade.

7. The proprotor system as recited in claim 5 wherein each damping cylinder further comprises a fluid spring having an in-plane spring rate operable to provide lead-lag damping to the respective proprotor blade.

8. The proprotor system as recited in claim 5 wherein each damping cylinder further comprises a mechanical spring in combination with a fluid spring having an in-plane spring rate operable to provide lead-lag damping to the respective proprotor blade.

9. The proprotor system as recited in claim 5 wherein at least a portion of each damping cylinder is operable to rotate about the pitch change axis of the respective proprotor blade responsive to a change in pitch of the respective proprotor blade.

10. The proprotor system as recited in claim 1 wherein each lead-lag damper further comprises an elastomeric damping element coupled to the rotor hub and a damping link coupling the respective proprotor blade to the elastomeric damping element, the damping link having a first rotary bearing coaxially aligned with the pitch change axis of the respective proprotor blade and a second rotary bearing coupled to the elastomeric damping element.

11. The proprotor system as recited in claim 1 further comprising a plurality of blade anchors each coupling one of the spherical bearings with the rotor hub.

12. The proprotor system as recited in claim 1 further comprising a plurality of blade grips each coupling one of the spherical bearings with the respective proprotor blade.

13. The proprotor system as recited in claim 12 wherein each blade grip further comprises a pitch horn operable to receive collective input from a pitch control assembly.

14. The proprotor system as recited in claim 12 wherein each blade grip further comprises a pitch horn operable to receive cyclic input from a pitch control assembly.

15. A tiltrotor aircraft having a helicopter flight mode and an airplane flight mode, the tiltrotor aircraft comprising:
a fuselage;
a wing extending from the fuselage having first and second outboard ends;
first and second pylon assemblies respectively coupled to the wing proximate the first and second outboard ends; and
a proprotor system operably associated with each pylon assembly, each proprotor system including:
a rotor hub;
a plurality of proprotor blades coupled to the rotor hub such that each proprotor blade has three independent degrees of freedom relative to the rotor hub including blade pitch about a pitch change axis, blade flap about a flapping axis and lead-lag about a lead-lag axis;
a plurality of twin spherical elastomeric centrifugal force bearings each coupling one of the proprotor blades with the rotor hub and each providing a coincident hinge with a center point for the respective pitch change, flapping and lead-lag axes between a pair of oppositely disposed spherical surfaces; and
a plurality of lead-lag dampers each coupling one of the proprotor blades with the rotor hub, each lead-lag damper aligned with the pitch change axis of the respective proprotor blade, thereby providing pitch independent lead-lag damping.

16. The tiltrotor aircraft as recited in claim 15 wherein each lead-lag damper further comprises an in-plane spring rate that is independent of blade pitch.

17. The tiltrotor aircraft as recited in claim 15 wherein each lead-lag damper further comprises a damping cylinder coaxially aligned with the pitch change axis of the respective proprotor blade, a damping support coupled to the rotor hub and a damping link coupling the damping cylinder to the damping support, the damping link coupled to the damping support inline with the flapping axis of the respective proprotor blade.

18. The tiltrotor aircraft as recited in claim 17 wherein each damping cylinder further comprises a spring having an in-plane spring rate operable to provide lead-lag damping to the respective proprotor blade, the spring selected from the group consisting of a mechanical spring, a fluid spring and combinations thereof.

19. The tiltrotor aircraft as recited in claim 15 wherein each lead-lag damper further comprises an elastomeric damping element coupled to the rotor hub and a damping link coupling the respective proprotor blade to the elastomeric damping element, the damping link having a first rotary bearing coaxially aligned with the pitch change axis of the respective proprotor blade and a second rotary bearing coupled to the elastomeric damping element.

20. The tiltrotor aircraft as recited in claim 15 further comprising a plurality of blade grips each coupling one of the spherical bearings with the respective proprotor blade, each blade grip including a pitch horn operable to receive at least one of collective input and cyclic input from a pitch control assembly.

* * * * *